United States Patent Office 3,582,402
Patented June 1, 1971

3,582,402
TECHNIQUE FOR DECONTAMINATING METAL SURFACES IN NUCLEAR REACTORS
Stanley F. Wisla, Yorktown Heights, N.Y., assignor to Atcor Inc., Hawthorne, N.Y.
No Drawing. Filed Apr. 16, 1968, Ser. No. 721,582
Int. Cl. C23g 1/06, 1/08
U.S. Cl. 134—3
4 Claims

ABSTRACT OF THE DISCLOSURE

A technique for removing the tenacious ferrite scale formed by the flow of water coolant through the stainless steel conduits of a nuclear reactor, the technique involving the use of highly concentrated phosphoric acid at elevated temperature.

---

This invention relates generally to a method of cleaning oxide scale from metallic surfaces, and more particularly to the removal of contaminated ferrite films from stainless steel surfaces incorporated in nuclear power reactors.

In the operation of certain nuclear reactors specifically of the aqueous heterogeneous type, light water is circulated through the reactor system and associated equipment. After extended operations, an oxide scale or film, comprised chiefly of the component corrosion products, deposits on the various metal surfaces. This film, because of neutron irradiation of the corrosion products, is highly radioactive and must be removed for safe operating and maintenance practices.

The extent to which these films resist dissolution and removal and the extent of the radiation field produced depends primarily upon the length of time the scale has been allowed to "develop." It is to be understood that the term "develop" in this context does not refer to thickness build-up as in a conventional steam-water system, but rather to the resulting variations in film composition.

An X-ray diffraction examination was performed on one such typical film that had developed on the stainless steel surfaces of a heat exchanger after extended operations of an aqueous heterogeneous reactor. The diffractometer technique was employed. The ASTM powder data file was used for identification. The only phase identified was $NiFe_2O_4$. Spectrographic analysis revealed the following composition.

| | Percent |
|---|---|
| $Al_2O_3$ | 1.00 |
| $Cr_2O_3$ | 4.2 |
| $CuO$ | 2.7 |
| $Fe_2O_3$ | 57.20 |
| $MnO_2$ | 1.75 |
| $NiO$ | 30.50 |
| $MgO$ | 0.07 |
| $SiO_2$ | 0.90 |
| $MoO_3$ | 1.10 |
| $TiO_2$ | 0.10 |
| $CoO$ | 0.42 |
| $ZrO_2$ | 0.06 |

Various types of agents have heretofore been used in decontaminating metal surfaces and more generally in removing oxide scale. However, none of these reagents, under presently known use conditions, with the exception of an acidified chromous sulfate solution, as disclosed in Pat. No. 2,981,643 issued Apr. 25, 1961, have been found to be successful in dissolving the film of the above-identified composition. Further, it was found that the acidified chromous sulfate reagent was not practical when used in a large reactor system because of the difficulty in keeping the chromium in the divalent form.

It must be noted that certain other agents successfully remove the oxide scale but produce relatively large undissolved oxide flakes that cause difficulty by clogging and settling in inaccessible portions of a system being cleaned. Other agents cannot be used because of the possibility of damage to the base metal.

It is, therefore, the main object of this invention to successfully and without damage to the base metal, remove the ferrite film that is now presenting a considerable problem to the nuclear industry.

An additional object of this invention which is also important is to provide an improved decontaminating agent which involves a one-step operation where in the past a multi-step and time-consuming procedure was required. Such procedures, as described in Pat. No. 3,080,-323 issued Mar. 5, 1963, which are commonplace today, increase maintenance costs considerably in addition to the costs involved in the down-time of the power station incurred during the time consumed in achieving decontamination.

In accordance with this invention, oxide scale and in particular ferrite scale may be removed from the stainless steel surface by contacting the surface with a strong concentration of phosphoric acid at elevated temperatures.

I have found that the reducing action of the hot phosphoric acid is sufficient to modify the ferrite film to such an extent that the acidic nature of the solution dissolves greater than 98% of the scale. The remaining 2% of the scale is also removed from the surface, but is in the form of extremely fine particles, readily dispersible for removal from the system by subsequent rinsing. Scales of composition less resistant to dissolution than ferrite will be completely dissolved. No evidence of corrosion damage to the metal was found on metallographic examination.

A wide range of temperatures and reagent concentrations may be employed within the scope of this invention. However, a concentration of at least approximately 50% by weight at a temperature of 100° C. to 110° C. must be employed to achieve scale removal. I have found that when using a concentration of 75% by weight phosphoric acid at a temperature of 100° C. to 110° C., complete scale removal can be accomplished in less than six hours.

While lower concentrations of phosphoric acid have been used as a cleaning agent for metals, it has been discovered that unless the concentration is at least about 50% by weight, in the temperature range indicated, it has little effect on the ferrite film adhering to the substrate. Thus, I have found that when using a 10% by weight phosphoric acid solution, even after eight hours of immersion at 100° C., the acid had virtually no effect on the film.

Although the method according to the invention is particularly effective with stainless steels of the 316 type, other metals and alloys of similar corrosion resistance may be successfully cleaned by the method. Moreover, in the use of chemical agents for cleaning large systems where absolute control of reagent concentration and temperature cannot be assured, certain corrosion inhibitors are used to further protect the base metal. Therefore, though the invention as described does not excessively attack the metal surface to be cleaned, I recommend the use of a suitable inhibitor, such as Rodine 220, at a concentration of approximately 0.4% by weight when applying this invention to the cleaning of a large closed system.

While there has been described a preferred embodiment of "Technique For Decontaminating Metal Surfaces In Nuclear Reactors," in accordance with the invention, it will be appreciated that many changes and modifications may be made therein without, however, departing from the essential spirit of the invention as defined in the annexed claims.

Having thus described my invention, what I claim is:

1. A method of removing tenacious ferrite scale from the surfaces of stainless steel conduits incorporated in a nuclear reactor, said scale having radioactive contaminants therein produced by the flow of water through said conduits, said method acting to remove the contaminated scale without corroding said conduits and comprising the steps of:
   (a) contacting said surfaces with a solution consisting essentially of phosphoric acid whose concentration is in a range of about fifty percent to seventy-five percent by weight, and whose temperature is elevated to at least about 100° C.,
   (b) maintaining said contact for a period of several hours sufficient to dissolve substantially all of said scale from said surface, and
   (c) thereafter draining the resultant solution to provide scale-free surfaces.

2. The method set forth in claim 1, wherein the temperature of said acid is in a range of about 100° to 110° C.

3. The method as set forth in claim 1, further including the subsequent step of rinsing the surface to remove particulate matter therefrom.

4. The method as set forth in claim 1, wherein a corrosion inhibitor is added to said phosphoric acid in a percentage sufficient to protect the base metal.

References Cited

UNITED STATES PATENTS

| | | | |
|---|---|---|---|
| 2,650,156 | 8/1953 | Shelton-Jones | 134—3X |
| 2,650,157 | 8/1953 | Cochran | 134—41X |
| 2,662,814 | 12/1953 | Swihart | 134—41UX |
| 2,692,189 | 10/1954 | Ro | 134—41X |
| 2,981,643 | 4/1961 | Baybarz | 134—3 |
| 3,410,803 | 11/1968 | Hoover | 134—3X |
| 3,440,095 | 4/1969 | Larsonneur | 134—41X |
| 3,460,989 | 8/1969 | Rusch | 134—3 |

JOSEPH SCOVRONEK, Primary Examiner

D. G. MILLMAN, Assistant Examiner

U.S. Cl. X.R.

134—22, 41; 252—87, 147